(12) United States Patent
Takenaka et al.

(10) Patent No.: US 7,658,246 B2
(45) Date of Patent: Feb. 9, 2010

(54) LEG JOINT ASSIST DEVICE OF LEGGED MOBILE ROBOT

(75) Inventors: Toru Takenaka, Wako (JP); Hiroshi Gomi, Wako (JP); Kazushi Hamaya, Wako (JP); Kazushi Akimoto, Wako (JP); Shinya Shirokura, Wako (JP); Minami Asatani, Wako (JP); Katsushi Tanaka, Gyoda (JP)

(73) Assignees: Honda Motor Co., Ltd., Tokyo (JP); Showa Corporation, Gyoda-shi (JP)

( * ) Notice: Subject to any disclaimer, the term of this patent is extended or adjusted under 35 U.S.C. 154(b) by 302 days.

(21) Appl. No.: 11/575,545

(22) PCT Filed: Aug. 17, 2005

(86) PCT No.: PCT/JP2005/015010

§ 371 (c)(1),
(2), (4) Date: Mar. 19, 2007

(87) PCT Pub. No.: WO2006/033209

PCT Pub. Date: Mar. 30, 2006

(65) Prior Publication Data

US 2008/0210477 A1   Sep. 4, 2008

(30) Foreign Application Priority Data

Sep. 22, 2004   (JP)   ............................. 2004-275385

(51) Int. Cl.
*B25J 19/00* (2006.01)
(52) U.S. Cl. .......................................... 180/8.6; 901/1

(58) Field of Classification Search .................. 180/8.1, 180/8.5, 8.6; 901/1
See application file for complete search history.

(56) References Cited

U.S. PATENT DOCUMENTS

| | | | |
|---|---|---|---|
| 6,962,220 B2 * | 11/2005 | Takenaka et al. | 180/8.6 |
| 7,143,850 B2 * | 12/2006 | Takenaka et al. | 180/8.6 |
| 7,492,115 B2 * | 2/2009 | Gomi et al. | 318/568.11 |
| 2004/0261561 A1 * | 12/2004 | Takenaka et al. | 74/490.01 |

* cited by examiner

FOREIGN PATENT DOCUMENTS

| | | |
|---|---|---|
| JP | 11-300660 | 11/1999 |
| JP | 2001-198864 | 7/2001 |
| JP | 2003-103480 | 4/2003 |
| JP | 2003-145477 | 5/2003 |

*Primary Examiner*—Kevin Hurley
(74) *Attorney, Agent, or Firm*—Rankin, Hill & Clark LLP (57) ABSTRACT

An assist device 11 is equipped with a spring means 21 (gas spring), and a piston 24 in a cylinder 23 moves upward or downward according to a relative displacement motion (flexing or stretching motion) of a thigh 4 and a crus 5 at a knee joint 8 of a leg 3 of a robot. Air chambers 25 and 26 above and below the piston 24 are filled with gases. If a flexing degree at the knee joint 8 is a predetermined value or less, then the air chambers 25 and 26 are brought into communication through a groove 28 in the cylinder 23, and the spring means 21 does not generate an elastic force, but if the flexing degree exceeds the predetermined value, then the air chambers 25 and 26 are hermetically sealed from each other and the spring means 21 produces an elastic force, the elastic force acting on the knee joint 8 as assisting driving force. A burden on a joint actuator of a leg can be reduced, while reducing energy consumption of the robot by using a small and simple construction. Moreover, a change in the characteristics of an assisting driving force of the spring means 21 in response to a flexing degree of the knee joint 8 can be restrained.

8 Claims, 7 Drawing Sheets

LEG JOINT ASSIST DEVICE OF LEGGED MOBILE ROBOT

TECHNICAL FIELD

The present invention relates to a leg joint assist device for generating an assisting driving force in a joint of a leg of a legged mobile robot, such as a bipedal mobile robot, the assisting driving force assisting a joint actuator for driving the joint.

BACKGROUND ART

Hitherto, as this type of assist device, there have been known one shown in FIG. 9 of Japanese Patent Application Publication No. 2001-198864 (hereinafter referred to as Patent Document 1) and one disclosed in Japanese Patent Application Publication No. 2003-145477 (hereinafter referred to as Patent Document 2) and one disclosed in Japanese Patent Application Publication No. 2003-103480 (hereinafter referred to as Patent Document 3) previously proposed by the present applicant.

The one disclosed in Patent Document 1 includes a spring provided between two link members (a thigh and a crus) connected by a knee joint of each leg of a bipedal mobile robot, a flexing or stretching motion of each leg at the knee joint being converted into an elastic energy of the spring. When the robot jumps, an assisting driving force (elastic force) is applied to the knee joint by the elastic energy. In this case, if the flexing angle of each leg at the knee joint is a predetermined angle, then the spring will be in a natural length state (a state wherein the elastic energy has been released), while the elastic energy will be accumulated in the spring at a flexing angle other than the predetermined angle, thus producing an assisting driving force.

The one disclosed in Patent Document 2 is adapted to convert a flexing or stretching motion of each leg at the knee joint into the elastic energy of a gas spring composed of a cylinder filled with a gas and to apply the assisting driving force (elastic force) to the knee joint by the elastic energy. In this case, the operational characteristics of the gas spring (the kinetic characteristics of a piston of the gas spring in response to flexing/stretching motions of each leg) are set such that, during a supporting leg period, as the flexing angle of the supporting leg at the knee joint (the inclination angle of the axis of the crus relative to the axis of the thigh) increases, the assisting driving force generated by the gas spring increases in the direction in which the leg stretches, and the assisting driving force (the assisting driving force in the stretching direction) generated by the gas spring reaches substantially a maximum value when the flexing angle of each leg at the knee joint reaches substantially a maximum (maximal) value. With this arrangement, a proper assisting driving force is generated by the gas spring in the supporting leg period during which a driving force to be generated at the knee joint reaches its maximum value, thus reducing a burden on a joint actuator of the knee joint.

The one disclosed in Patent Document 3 is provided with a spring means (a gas spring or the like) that converts flexing/stretching motions of each leg at the knee joint into elastic energy, and also provided with a mechanism for cutting off the transmission of the flexing/stretching motions of each leg to the spring means, as appropriate (hereinafter referred to as the locking mechanism). In this case, according to the one disclosed in Patent Document 3, the locking mechanism is actuated at a predetermined timing through the intermediary of an electromagnetic solenoid or a solenoid valve so as to generate the assisting driving force (elastic force) in the spring means in a mode wherein the flexing/stretching motions of the leg are transmitted to the spring means during a period in which the assisting driving force should be imparted to the knee joint. In a period other than that, a mode wherein the flexing/stretching motions of the leg are not transmitted to the spring means is set so as to prevent the assisting driving force (elastic force) from being imparted to the knee joint from the spring means.

In the one disclosed in Patent Document 1, the assisting driving force by the spring is not generated only when the flexing angle of the leg at the knee joint is the predetermined angle, meaning that the elastic force by the spring is always generated at any other flexing angles. For this reason, even if a required driving force to be generated at the knee joint of each leg is small, there are cases where a driving force for canceling the elastic force of the spring must be produced in the joint actuator of the knee joint, resulting in an increase in the energy consumed by the joint actuator in some cases. Especially in the one disclosed in Patent Document 1, the elastic force of the spring increases as the flexing angle of the leg at the knee joint increases, so that a driving force generated at the joint actuator in a free leg period of a leg, during which the required driving force to be generated at the knee joint should be small, will be inevitably large, thus making it difficult to restrain a generated driving force of the joint actuator and eventually energy consumption.

Further, the aforesaid one disclosed in Patent Document 2 makes it possible to minimize the maximum value of the generated driving force of the joint actuator over the entire period when the robot travels, permitting a reduced burden on the joint actuator to be achieved. However, the flexing angle of the knee joint at which the elastic force of the gas spring is zero is limited to a certain particular angle, and the elastic force of the gas spring is generated in the leg flexing direction in a state wherein the flexing angle is small (in a state wherein the leg is substantially stretched). Hence, a driving force for canceling the elastic force of the gas spring must be generated in the joint actuator of the knee joint in a situation wherein the driving force to be generated in the knee joint is the driving force in the leg stretching direction, as in a state wherein the robot is standing upright, or in a situation wherein the driving force to be generated in the knee joint is substantially zero, as in a state wherein a supporting leg is about to leave a floor when a robot travels. Thus, the one disclosed in Patent Document 2 has been inadequate for accomplishing a further reduction in the energy consumption of the joint actuator of the knee joint.

In the aforesaid one disclosed in Patent Document 3, the elastic force (assisting driving force) of the spring means can be imparted to the knee joint only when necessary; however, the aforesaid locking mechanism and an electromagnetic solenoid or a solenoid valve for operating the locking mechanism are required, inconveniently leading to a larger or a complicated construction. Furthermore, energy for operating the electromagnetic solenoid or the solenoid valve is required, hindering a further reduction in the energy consumption of the robot.

The present invention has been made with a view of the background described above, and it is an object of the invention to provide a leg joint assist device that permits a reduction in energy consumption of a robot and also a reduction in a burden on a joint actuator of a leg by using a small and simple construction.

DISCLOSURE OF INVENTION

To this end, a leg joint assist device of a legged mobile robot in accordance with the present invention is characterized by including:

in a legged mobile robot equipped with a plurality of legs constructed by consecutively installing a plurality of link members from a body through the intermediary of a plurality of joints, a spring means for generating an assisting driving force imparted to a specific joint, together with a driving force of a joint actuator for driving the specific joint, by the elastic energy accumulated in response to a relative displacement motion of a pair of link members connected by the specific joint, at least one joint of the plurality of joints of each leg being defined as the specific joint, wherein the spring means is a means that includes a cylinder, a piston provided such that the piston is free to slidably move in the cylinder in response to a relative displacement motion of the pair of link members, a pair of air chambers that are formed on both sides of the piston in the cylinder and whose volumes change in response to a sliding movement of the piston, at least one air chamber of the pair of air chambers being a spring-gas-charged chamber, and a gas charged in the spring-gas-charged chamber, the means elastically generating the assisting driving force by compression or expansion of the gas in the spring-gas-charged chamber as the piston slidably moves, a gas passage provided in the spring means such that the gas passage brings the spring-gas-charged chamber in communication with outside if a relative displacement amount of the pair of link members falls within a predetermined range set beforehand, while the gas passage shuts off the spring-gas-charged chamber from outside by the piston if the relative displacement amount deviates from the predetermined range, wherein if the relative displacement amount of the pair of link members falls within the predetermined range, then the gas is circulated between the spring-gas-charged chamber and outside through the gas passage in response to a sliding movement of the piston according to a relative displacement motion of the pair of link members, thereby preventing compression or expansion of the gas in the spring-gas-charged chamber.

According to the invention described above, if the relative displacement amount of the pair of link members falls within the predetermined range, then the spring-gas-charged chamber and outside are brought into communication through the gas passage in response to a sliding movement of the piston according to a relative displacement motion of the pair of link members, thereby preventing compression or expansion of a gas in the spring-gas-charged chamber. This arrangement prevents the spring means from generating an assisting driving force when the relative displacement amount lies within the predetermined range. Further, if the relative displacement amount deviates from the predetermined range, then the piston shuts off the spring-gas-charged chamber from outside. Thus, the gas in the spring-gas-charged chamber compresses or expands in response to a sliding movement of the piston according to the relative displacement motion of the pair of link members. This causes the spring means to generate the assisting driving force.

Thus, according to the present invention, providing the gas passage with the spring means makes it possible, without using an electronic device, such as a solenoid valve, to cause the spring means to generate an assisting driving force only if the relative displacement amount deviates from the predetermined range and to prevent the spring means from generating the assisting driving force if the relative displacement amount falls within the predetermined range. Hence, the leg joint assist device in accordance with the present invention makes it possible to reduce a burden on a joint actuator of a leg while also reducing energy consumption of a robot by a small and simple construction. Furthermore, if the relative displacement amount lies within the predetermined range, the spring charged chamber is brought into communication with outside, thereby preventing the gas in the spring charged chamber from being compressed or expanded. With this arrangement, if a state wherein the relative displacement amount lies within the predetermined range occurs regularly, as in a case where the robot steadily travels, then even if a gas leaks between the two air chambers in the cylinder through a gap between the piston and the cylinder, it is possible to restrain a change in the characteristics of an assisting driving force of the spring means with respect to the relative displacement amount (e.g., a change in which the relative displacement amount for the assisting driving force to reach a certain value gradually changes as time elapses).

In the present invention, the spring-gas-charged chamber may include both or either one of the pair of air chambers in the cylinder. Preferably, however, the spring-gas-charged chamber includes both of the pair of air chambers and the aforesaid gas passage is a gas passage that provides mutual communication between the paired air chambers if a relative displacement amount of the pair of link members lies within the predetermined range, one air chamber of the paired air chambers serving as the outside relative to the other air chamber.

With this arrangement, if a relative displacement amount of the pair of link members lies within the predetermined range, then a gas is mutually circulated between the pair of air chambers through the gas passage. Hence, even if the piston slidably moves due to a relative displacement motion of the pair of link members, the gases in both air chambers do not compress or expand, resulting in a state wherein the spring means does not generate an assisting driving force. And, if the relative displacement amount deviates from the predetermined range, then each of the paired air chambers is cut off by the piston from the other air chamber serving as the outside thereof (each air chamber being hermetically sealed), so that the gas in one air chamber of the two air chambers is compressed, while the gas in the other air chamber is expanded at the same time. Thus, the gases in both air chambers generate an elastic force. This makes it possible to reduce the size of the construction of the spring means and also to increase the assisting driving force that can be generated.

If the spring-gas-charged chamber includes either one of the pair of air chambers, then the other air chamber may be, for example, opened to the air.

Further, in the present invention, preferably, the gas passage is composed of one or more grooves formed in the inner peripheral surface of the cylinder, and if a relative displacement amount of the pair of link members lies within the predetermined range, then one end of each groove is brought into communication with one of the pair of air chambers and the other end of the groove is brought into communication with the other of the pair of air chambers; if a relative displacement amount of the pair of link members lies within the predetermined range, then both ends of each groove are shut off by the piston from at least either one air chamber of the pair of air chambers.

With this arrangement, if the relative displacement amount falls within the predetermined range, then the paired air chambers in the cylinder are brought into communication through the groove constituting the gas passage, causing the gas to be circulated between the two air chambers. Thus, even if the piston slidably moves due to a relative displacement motion of the pair of link members, the gases in both air chambers do not compress or expand, resulting in a state wherein the spring means does not generate an assisting driving force. And, if the relative displacement amount deviates from the predetermined range, then the gases cannot be circulated between the two air chambers, so that the gas in at least one air chamber (the spring-gas-charged chamber) is compressed or expanded, leading to a state wherein the spring means generates an assisting driving force. In this case, the groove constituting the gas passage is formed in the inner peripheral surface of the cylinder, thus allowing the construction of the spring means to be effectively made smaller.

Further, in the present invention, preferably, if the legged mobile robot is a bipedal mobile robot equipped with two legs, each leg being formed by consecutively installing a thigh, a crus, and a foot in order, as the aforesaid link members, through the intermediary of a hip joint, a knee joint, and an ankle joint from the aforesaid body side, and if the specific joint is a knee joint that flexibly connects the thigh and the crus serving as the aforesaid pair of link members, then the aforesaid predetermined range of relative displacement amount of the pair of link members is a range in which a flexing degree as the aforesaid relative displacement amount of the thigh and the crus at the knee joint becomes a predetermined amount or less.

More specifically, in the bipedal mobile robot, in a state wherein the flexing degree at the knee joint is small (a state wherein the legs or a leg is substantially stretched), as in both legs when the robot is standing upright at rest or in a leg immediately before leaving a floor when the robot is traveling, a driving force (torque) that should be generated at the knee joint of each leg is generally relatively small or close to zero. Hence, setting the predetermined range within which an assisting driving force is not generated by the spring means to a range within which the flexing degree at the knee joint is a predetermined amount or less (a range of flexing degrees of a knee joint at which a leg is substantially stretched) makes it possible to avoid a situation, wherein a driving force for canceling an assisting driving force of the spring means must be generated in a joint actuator of the knee joint, at a flexing degree of the predetermined amount or less. As a result, wasteful energy consumption by the robot can be repressed.

Further, the flexing degree of each leg of the bipedal mobile robot is generally larger when the leg is apart from a floor than when the leg is in contact with the floor. On the other hand, a driving force (torque) to be generated at the knee joint of each leg is generally smaller when the leg is apart from a floor than when the leg is in contact with the floor. Therefore, in a state wherein the flexing degree of each leg exceeds the predetermined amount (in a state wherein the predetermined range is exceeded), if the assisting driving force of the spring means were monotonically increased as the flexing degree increased, then there would be a danger in that a driving force to be generated in the joint actuator when the leg is apart from a floor increases in a direction in which the assisting driving force of the spring means is canceled.

Preferably, therefore, in the aforesaid bipedal mobile robot, the spring means is constructed such that, if the flexing degree lies in a range between the aforesaid predetermined amount and a second predetermined amount, which is higher than the predetermined amount, then the aforesaid assisting driving force increases in the leg stretching direction as the flexing degree increases and if the flexing degree is a flexing degree that exceeds the second predetermined amount, then the assisting driving force is smaller than an assisting driving force predetermined value, which is the value of the assisting driving force when the flexing degree is set to agree with the second predetermined amount, or the assisting driving force is approximately equal to the assisting driving force predetermined value.

With this arrangement, if the flexing degree of each leg exceeds the second predetermined amount, the assisting driving force will be smaller than the assisting driving force predetermined value, which is the value of the assisting driving force when the flexing degree is set to agree with the second predetermined amount, or will be approximately equal to the assisting driving force predetermined value. This makes it possible to prevent the assisting driving force from becoming excessive in a state wherein each leg is apart from a floor (in a state wherein the flexing degree of each leg exceeds the second predetermined amount). As a result, it is possible to prevent the driving force of a joint actuator from increasing in a period during which each leg becomes a free leg.

Incidentally, the second predetermined amount is ideally a flexing degree in the vicinity of a maximum flexing degree (the flexing degree at a knee joint) in a state wherein each leg is in contact with a floor when the bipedal mobile robot travels in a fixed gait mode on a substantially flat floor. With this arrangement, when each leg is in contact with a floor, a sufficient assisting driving force can be generated by the spring means in a state wherein the flexing degree of the leg exceeds the predetermined amount, and when each leg is apart from the floor, the maximum value of the assisting driving force generated by the spring means can be minimized thereby to reduce a burden on a joint actuator of a knee joint.

BEST MODE FOR CARRYING OUT THE INVENTION

Figure 1:
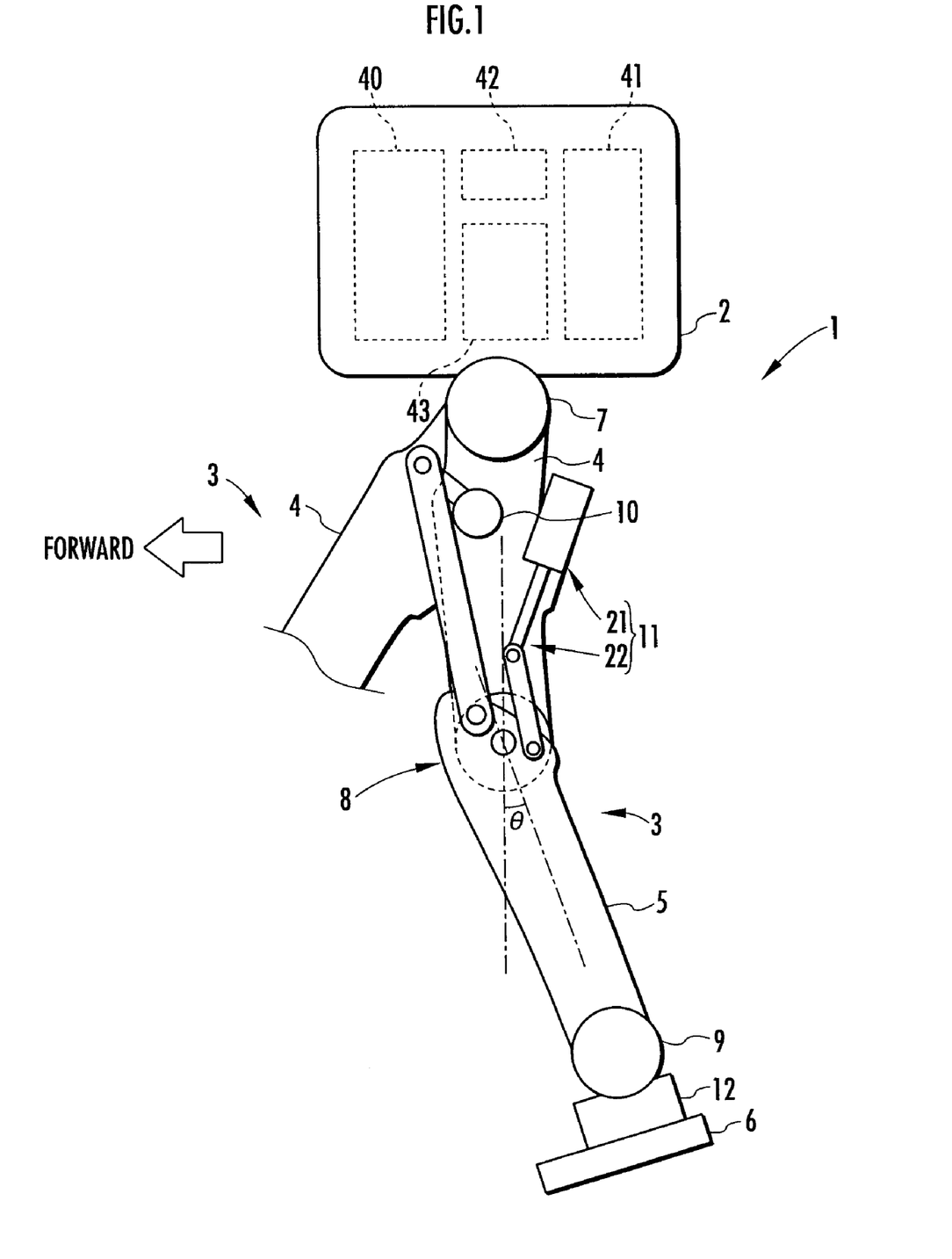
FIG. 1 is a diagram schematically showing the outlined construction of a legged mobile robot (a bipedal mobile robot) that includes an assist device according to an embodiment of the present invention.

A first embodiment of the present invention will be explained with reference to FIG. 1 to FIG. 7. FIG. 1 is a diagram schematically showing the construction of a bipedal mobile robot as a legged mobile robot in the present embodiment. As shown in the figure, a robot 1 is equipped with two legs 3 and 3 extendedly provided downward from a body 2, which is a base thereof. These legs 3 and 3 share the same structure, including an assist device, which will be discussed later, so that only a part of one leg 3 (the leg 3 on the right side as observed toward the front of the robot 1 in the figure) is shown in the figure.

As with the legs of a human being, each leg 3 is constructed by a thigh 4, a crus 5, and a foot 6 consecutively connected in order through the intermediary of a hip joint 7, a knee joint 8, and an ankle joint 9 from the body 2. More specifically, the thigh 4 of each leg 3 is extended from the body 2 through the intermediary of the hip joint 7, the crus 5 is connected to the thigh 4 through the intermediary of the knee joint 8, and the foot 6 is connected to the crus 5 through the intermediary of the ankle joint 9. The thigh 4, the crus 5, and the foot 6 correspond to link members in the present invention.

In this case, the hip joint 7 is capable of rotational movement about three axes, namely, in the longitudinal direction, the lateral direction, and the vertical direction of the robot 1. The knee joint 8 is capable of rotational movement about one axis, namely, in the lateral direction, and the ankle joint 9 is capable of rotational movement about two axes, namely, in the longitudinal direction and the lateral direction. The rotational movements of the joints 7, 8, and 9 enable each leg 3 to perform motions that are substantially similar to those of the legs of a human being. Each leg 3 is provided with an electric motor 10 as a joint actuator (hereinafter referred to as the knee joint electric motor 10) to perform its rotational movements about the one axis in the lateral direction of the knee joint 8, and each leg 3 is also provided with an assist device 11 for imparting an assisting driving force to the knee joint 8 (an assisting rotational force acting on the knee joint 8 in parallel to a rotational driving force of the knee joint electric motor 10). Although not shown, the hip joint 7 is provided with three electric motors to perform its rotational movements about the three axes, and the ankle joint 9 is provided with two electric motors to perform its rotational movements about the two axes.

In the present embodiment, each foot 6 is connected to the ankle joint 9 through the intermediary of a six-axis force sensor 12 to detect a floor reaction force acting on each foot 6 (the translational forces in the directions of three axes, namely, the longitudinal direction, the lateral direction, and the vertical direction of the robot 1, and moments about three axes). Each of the joints 7, 8, and 9 is provided with an encoder (not shown) to detect their rotational positions (or the rotational angles of the electric motors for driving the joints 7 to 9).

Figure 2:
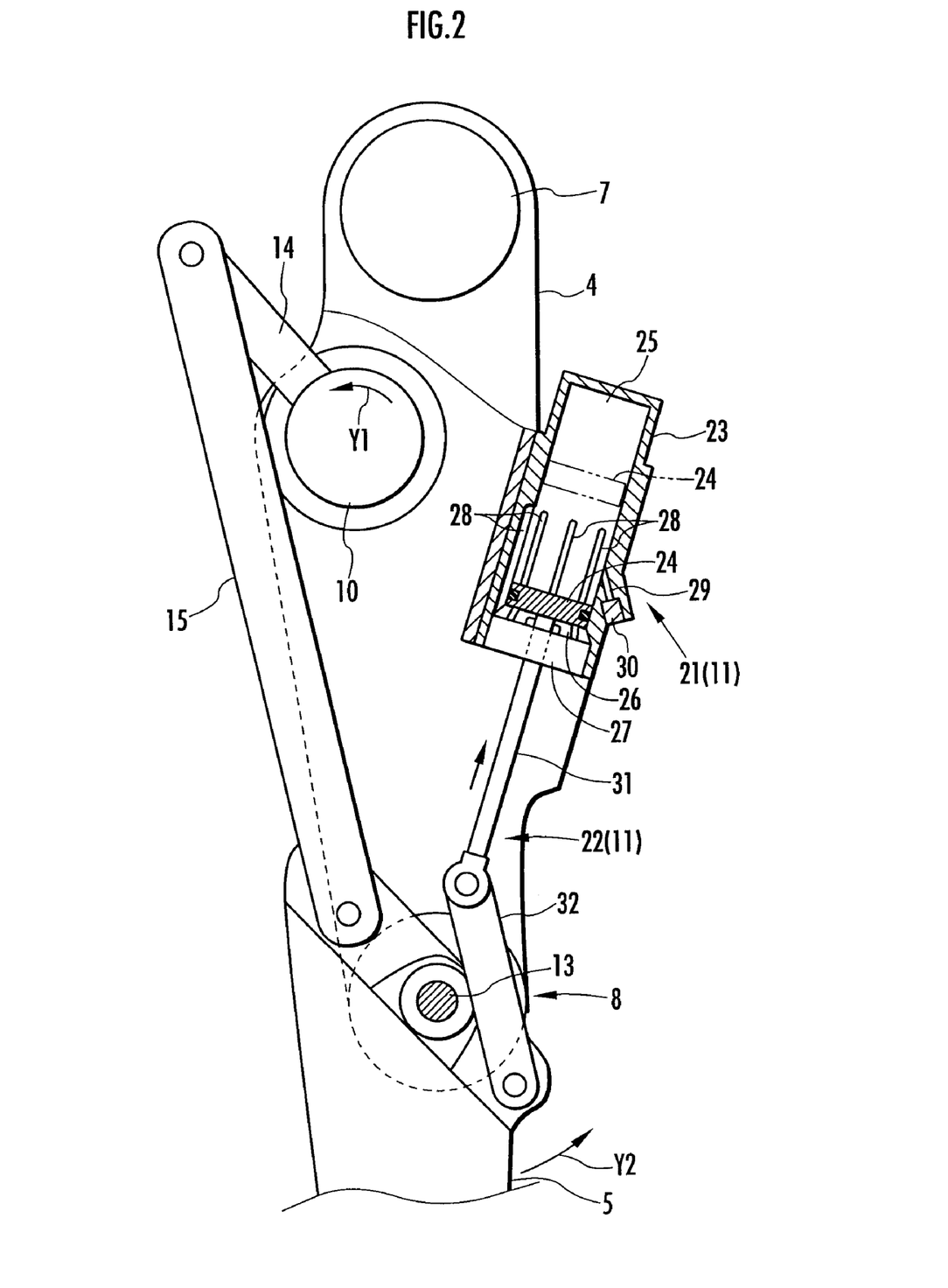
FIG. 2 is a diagram showing a construction related to a driving mechanism of a knee joint of the robot shown in FIG. 1.

In the present embodiment, the knee joint 8 corresponds to a specific joint in the present invention. The driving mechanism of the knee joint 8 including the assist device 11 will be further explained in reference with FIG. 2. FIG. 2 is a diagram showing the construction of the driving mechanism of the knee joint 8.

As shown in the figure, the upper end of the crus 5 is rotatively supported at the lower end of the thigh 4 through the intermediary of a supporting shaft 13 having an axis in the lateral direction of the robot 1 (in the direction perpendicular to the paper surface of FIG. 2). The knee joint electric motor 10 is installed at an upper part of the thigh 4 with its axis facing in the lateral direction of the robot 1 (in the axial direction of the supporting shaft 13), and a rotative piece 14 rotatively provided as an integral part of a rotor (not shown) thereof is connected to an upper end front part of the crus 5 (a part that is farther to the front side than the supporting shaft 13) through the intermediary of a connecting rod 15 extendedly provided substantially in the vertical direction along the front surface of the thigh 4. The connecting rod 15 has its upper end rotatively supported by the rotative piece 14 and its lower end rotatively supported by the upper end front of the crus 5.

The state shown in FIG. 2 is a state wherein the leg 3 has been stretched. From this state, when the rotative piece 14 is rotated in the direction of an arrow Y1 in the figure by the knee joint electric motor 10, the rotational force thereof is transmitted to the crus 5 through the intermediary of the connecting rod 15, causing the crus 5 to rotate about the supporting shaft 13 in the direction of an arrow Y2. Thus, the flexing motion (bending operation) of the leg 3 at the knee joint 8 is carried out. Further, rotating the rotative piece 14 in the opposite direction from the arrow Y1 by the knee joint electric motor 10 from the state wherein the leg 3 is flexed causes the crus 5 to rotate about the supporting shaft 13 in the opposite direction from the arrow Y2, thereby carrying out an extending motion (stretching operation) of the leg 3 at the knee joint 8. Thus, the rotation of the rotor of the knee joint electric motor 10 is transmitted to the crus 5 through the intermediary of the rotative piece 14 and the connecting rod 15, thereby performing the flexing/stretching motions (hereinafter referred to as the knee flexing/stretching motions) as relative displacement motions at the knee joint 8 between the thigh 4 and the crus 5.

The assist device 11 is equipped with a spring means 21, which is a gas spring having a cylinder, and a motion transmitting means 22 for transmitting the knee flexing/stretching motions to the spring means 21. The spring means 21 is equipped with a cylinder (external cylinder) 23 mounted such that it vertically extends aslant at the rear surface of the thigh 4, a piston 24 accommodated in the cylinder 23 such that it slidably moves in the axial direction thereof, and a pair of air chambers 25 and 26 formed in the cylinder 23 on both sides (top and bottom) of the piston 24. In the present embodiment, both air chambers 25 and 26 are spring-gas-charged chambers. These two air chambers 25 and 26 are filled with a pressurized gas, such as air.

The cylinder 23 is a bottomed cylindrical member with its bottom end open and covered by a capping member 27 attached to the bottom end (open end) thereof. The lower portion of the inner peripheral surface of the cylinder 23 has a plurality of grooves 28 formed such that they extend in the axial direction of the cylinder 23 with intervals provided in the peripheral direction thereof. These grooves 28 correspond to the gas passage in the present invention. When the piston 24 is positioned between both ends of each of the grooves 28, as indicated by the solid line in FIG. 2, the upper end and the lower end of each of the grooves 28 are brought into communication with the air chambers 25 and 26, leading to mutual communication between the two air chambers 25 and 26 through the grooves 28 (this state will be hereinafter referred to as the air-chambers-in-communication state). And, if the piston 24 moves upward beyond the upper ends of the grooves 28, as indicated by the hypothetical line in FIG. 2, both ends of each of the grooves 28 are shut off by the piston 24 from the upper air chamber 25. In this state, the air chambers 25 and 26 are isolated from each other by the piston 24, hermetically sealing the individual air chambers 25 and 26 (this state will be hereinafter referred to as the hermetically sealed air chamber state). The cylinder 23 has a gas inlet 29 for introducing a pressurized gas into the air chambers 25 and 26, the gas inlet 29 usually being closed by a covering member 30. The cylinder 23 is provided at a position where the axis thereof crosses the rotational axis of the knee joint 8 (the axis of the supporting shaft 13).

In the spring means 21 constructed as described above, the volumes of the air chambers 25 and 26 change as the piston 24 slidably moves. At this time, in the air-chambers-in-communication state, the pressures of the gases in the two air chambers 25 and 26 are maintained at constant pressures that are substantially equivalent to each other by the mutual circulation of the gases between the two air chambers 25 and 26 through the plurality of the grooves 28. In this air-chambers-in-communication state, compression or expansion of the gases in the two air chambers 25 and 26 is prevented, so that the gases do not produce elastic forces.

Meanwhile, in the hermetically sealed air chamber state, changes in the volumes of the air chambers 25 and 26 due to a sliding movement of the piston 24 cause the gases in the air chambers 25 and 26 to be compressed or expanded, so that the gases accumulate elastic energy and produce an elastic force. In this case, when the gas in one of the air chambers 25 and 26 is compressed, the gas in the other expands, so that the elastic forces of the gases in the air chambers 25 and 26 act on the piston 24. Supplementally, in the spring means 21 of the present embodiment, the air chamber 26 serves as outside relative to the air chamber 25, while the air chamber 25 serves as outside relative to the air chamber 26.

The motion transmitting means 22 converts a knee flexing/stretching motion into a translatory motion and transmits the translatory motion to the piston 24 of the spring means 21, and it has a piston rod 31 provided extendedly from the piston 24 toward the knee joint 8, penetrating the lower air chamber 26 and the capping member 27, and a link arm 32 that connects the distal end (the lower end) of the piston rod 31 to the upper end rear of the crus 5 (a part that is farther to the rear side than the supporting shaft 13). The link arm 32 has one end thereof rotatively supported by the distal end of the piston rod 31 and the other end thereof rotatively supported by the upper end rear part of the crus 5.

With the motion transmitting means 22 constructed as described above, the piston 24 moves together with the piston rod 31 in the axial direction of the cylinder 23 in response to knee flexing/stretching motions (rotational motions of the crus 5 about the supporting shaft 13). In this case, as the leg 3 is flexed at the knee joint 8 from the state wherein the leg 3 has been stretched as shown in FIG. 2 (as the crus 5 is rotated about the supporting shaft 13 in the direction of an arrow Y2), the piston 24 moves upward in the cylinder 23. As described above, the spring means 21 does not generate an elastic force until the piston 24 passes the upper ends of the plurality of the grooves 28, but once the piston 24 passes the upper ends of the plurality of the grooves 28, the gas in the upper air chamber 25 is compressed, while the gas in the lower air chamber 26 is expanded, causing the spring means 21 to produce an elastic force. The elastic force acts in the direction in which the piston 24 is pushed downward, thus acting as an assisting driving force about the supporting shaft 13 (an assisting rotational force; hereinafter referred to as the knee rotational assisting force) on the crus 5 through the intermediary of the piston rod 31 and the link arm 32.

Figure 3A:
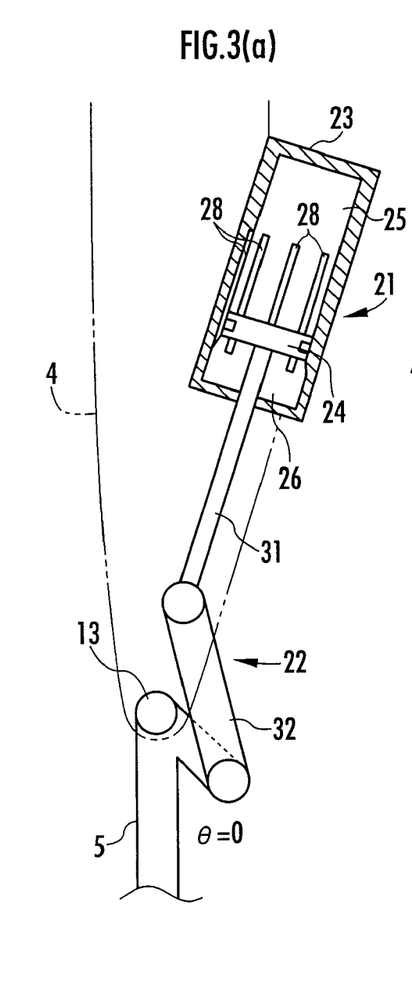
FIGS. 3(a) to (c) are diagrams for explaining a relationship between motions of a piston of a spring means of an assist device provided in the robot shown in FIG. 1 and flexing/stretching motions of a leg at a knee joint.
Figure 3B:
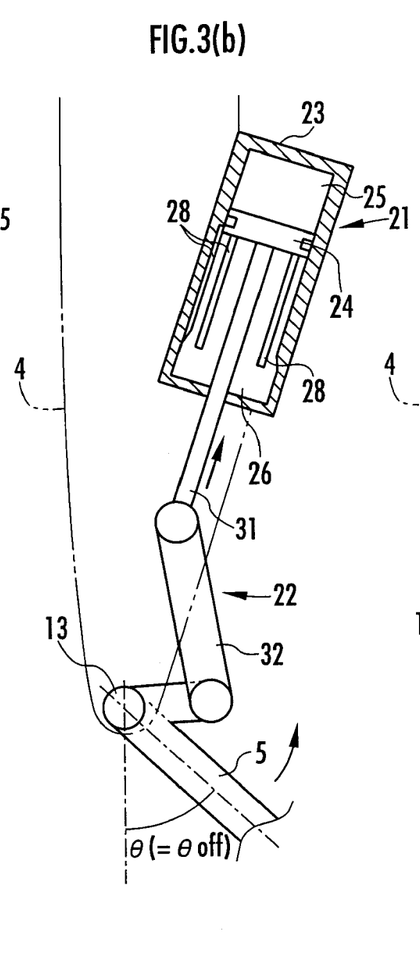
Figure 3C:
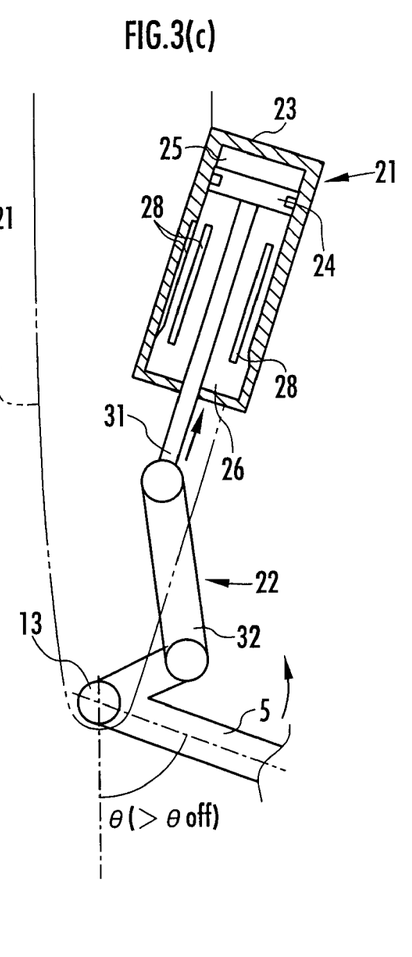
Figure 4:
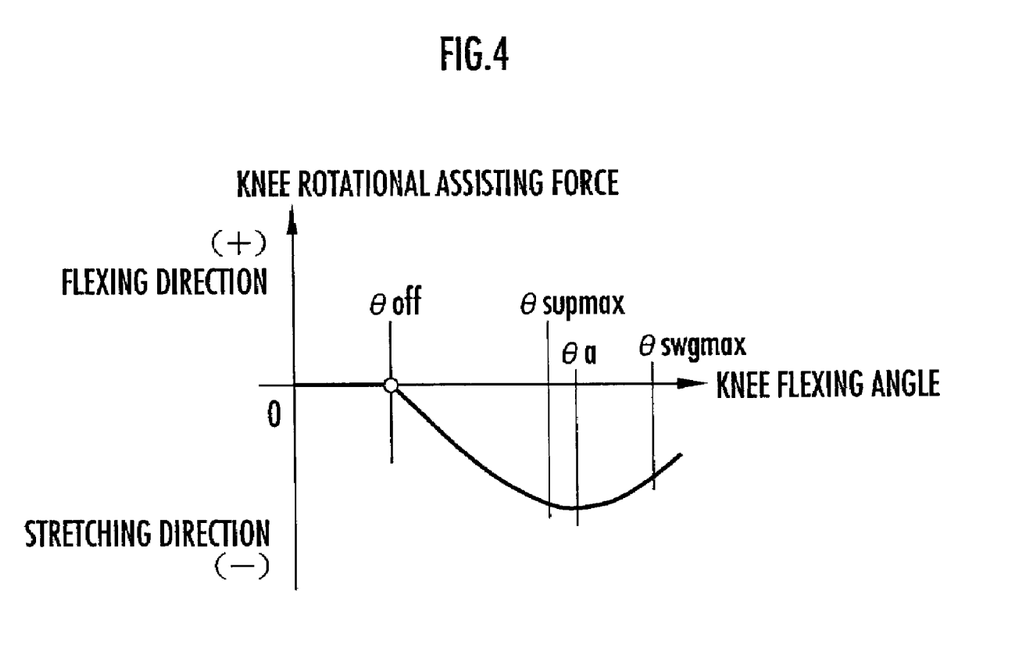
FIG. 4 is a graph showing a relationship between assisting forces produced by the spring means of the assist device provided in the robot shown in FIG. 1 and flexing angles of the knee joint.

The motions of the piston 24 in response to the knee flexing/stretching motions of the leg 3 and the characteristics of the changes in the knee rotational assisting force will now be explained. In an assist device 11 of the present embodiment, at the time of the knee flexing/stretching motions, the shift position of the piston 24 changes as shown in FIGS. 3($a$), ($b$), and ($c$). Further, at this time, the knee rotational assisting force by the spring means 21 changes as shown in FIG. 4 according to a knee flexing angle θ, which is a flexing angle between the thigh 4 and the crus 5 of each leg 3. FIGS. 3($a$) to ($c$) are diagrams showing the relationship between the flexing motions of the leg 3 at the knee joint 8 and the shift positions of the piston 24, and FIG. 4 is a graph showing the characteristics of changes in the knee rotational assisting force of the spring means 21 with respect to the knee flexing angle θ.

FIGS. 3($a$) to ($c$) show the spring means 21 and the crus 5 in simplified forms and also schematically show the thigh 4 by the hypothetical line. The knee flexing angle θ is defined as the angle formed by the axis of the crus 5 relative to the axis of the thigh 4, as shown in FIG. 1. Hence, a state in which the leg 3 has been stretched such that the axes of the thigh 4 and the crus 5, respectively, extend in the same direction (the state shown in FIG. 3($a$)) is the state in which θ=0. As the flexing degree of the leg 3 at the knee joint 8 increases, the knee flexing angle θ increases. In FIG. 4, regarding the knee rotational assisting force, a rotational force in the direction in which the leg 3 flexes at the knee joint 8 takes a positive value, while a rotational force in the direction in which the leg stretches takes a negative value.

Before further explaining the motions of the piston 24 and the characteristics of the knee rotational assisting forces of the spring means 21, the traveling modes of the robot 1 in the present embodiment will be explained with reference to FIGS. 5($a$) and ($b$). In the present embodiment, the robot 1 performs a running motion in a foot moving mode similar to that of a standard running of a human being on a level ground (flat floor)(hereinafter referred to as the standard running gait mode of a human being). To perform the running motion, a desired value of the knee flexing angle θ of each leg 3 (determined on the basis of a desired gait of the robot 1, which will be discussed later; hereinafter referred to as the desired knee flexing angle) and a rotational force required to be generated about the supporting shaft 13 of the knee joint 8 of the leg 3 on the basis of the desired knee flexing angle (hereinafter referred to as the required knee rotational force) exhibit the time-dependent changes shown by, for example, the graphs of FIG. 5($a$) and FIG. 5($b$). The graphs of FIGS. 5($c$) and ($d$) will be discussed later.

Figure 5:
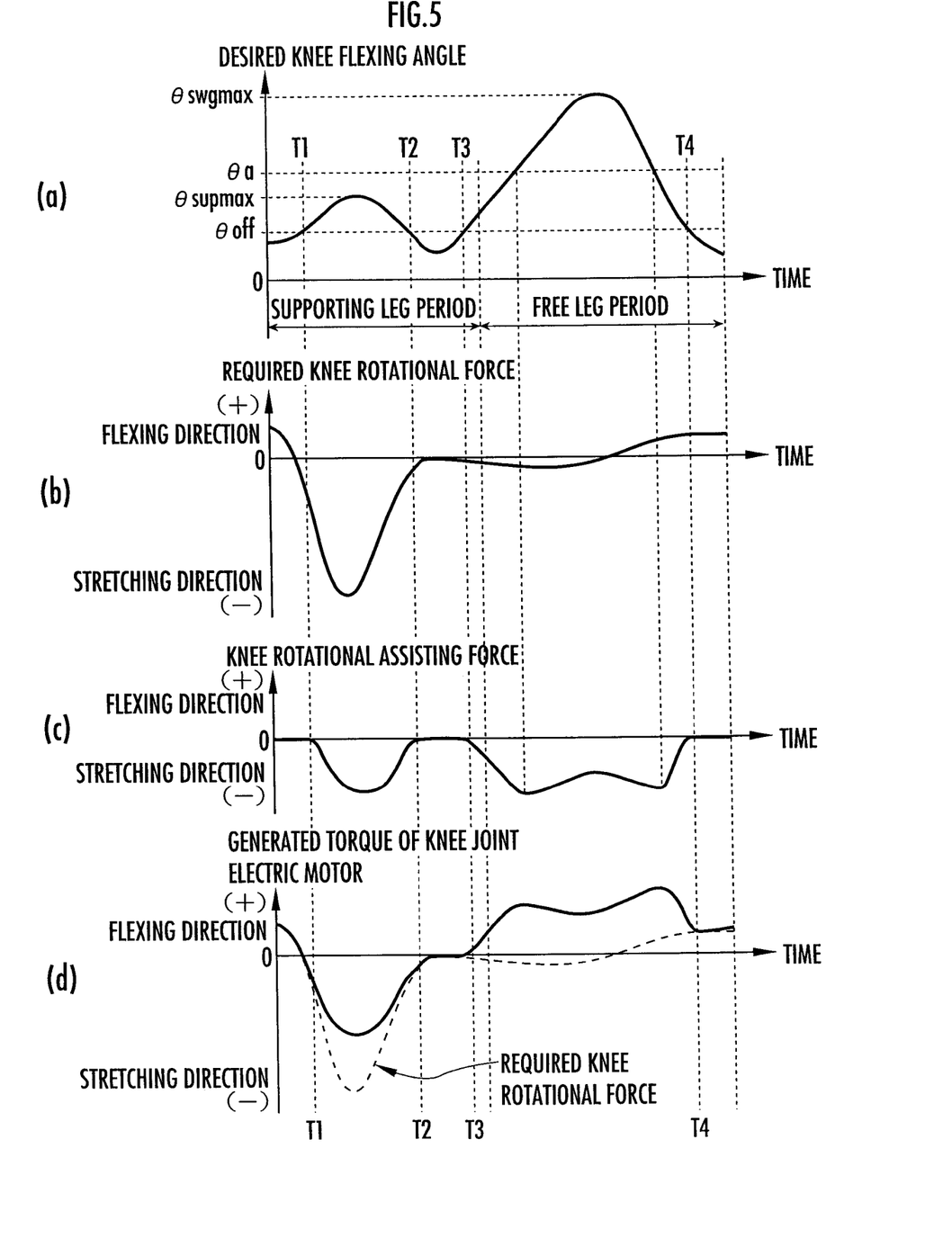
FIG. 5(a) is a graph illustrating a time-dependent change in the flexing angle of the knee joint of a leg in a running motion mode of the robot shown in FIG. 1.
FIG. 5(b) is a graph illustrating a time-dependent change in a required rotational force of the knee joint.
FIG. 5(c) is a graph illustrating a time-dependent change in an assisting driving force for the knee joint that is generated by the assist device in an embodiment.
FIG. 5(d) is a graph illustrating, by a solid line, a time-dependent change in torque produced by an electric motor of the knee joint in the embodiment.

When the robot 1 runs on a flat floor in the gait mode similar to the standard running gait mode of a human being, the desired knee flexing angle increases in the first half of a supporting leg period in which the foot 6 of the leg 3 comes in contact with the floor (the flexing degree of the leg 3 at the knee joint 8 increases), as shown in FIG. 5($a$). Then, in the second half of the supporting leg period, the desired knee flexing angle decreases until immediately before the end of the supporting leg period (the flexing degree of the leg 3 at the knee joint 8 decreases). Further, the desired knee flexing angle increases from a point immediately before the end of the supporting leg period to the first half of a free leg period (a period in which the foot 6 of the leg 3 is apart from the floor), and then, in the second half of the free leg period, the desired knee flexing angle decreases until immediately before the end of the free leg period. Immediately before the end of the free leg period, the desired knee flexing angle slightly increases. Thus, the desired knee flexing angle when the robot 1 is in the running motion mode takes maximum values θsupmax and θswgmax at the midpoint of the supporting leg period and at the midpoint of the free leg period, respectively, and takes minimum values at a point immediately before the end of the supporting leg period and at a point immediately before the end of the free leg period.

In the following explanation, the maximum values θsupmax and θswgmax of the desired knee flexing angle in the supporting leg period and the free leg period of each leg 3 will be referred to as the supporting leg period maximum knee flexing angle θsupmax and the free leg period maximum knee flexing angle θswgmax, respectively. In the running motion of the robot 1 in the gait mode similar to the standard running gait mode of a human being, generally, the supporting leg period maximum knee flexing angle θsupmax ideally falls within the range of about 40 to about 60 degrees. The free leg period maximum knee flexing angle θswgmax is an angle that is larger than the supporting leg period maximum knee flexing angle θsupmax and it is, for example, about double the supporting leg period maximum knee flexing angle θsupmax.

The required knee rotational force (a rotational force in the flexing direction of the leg 3 taking a positive value, while a rotational force in the stretching direction thereof taking a negative value) significantly decreases from a positive rotational force to a negative rotational force (the required knee rotational force significantly increases in the stretching direction of the leg 3) in the first half of the supporting leg period (the period during which the desired knee flexing angle increases in general), as shown in FIG. 5($b$). And, in the second half of the supporting leg period, the absolute value of the required knee rotational force decreases (the required knee rotational force in the stretching direction of the leg 3 decreases) until immediately before the end of the supporting leg period (the period during which the desired knee flexing angle decreases in general), then the rotational force will be approximately zero at a point immediately before the end of the supporting leg period. Further, from the point immediately before the end of the supporting leg period to the first half of the free leg period, the required knee rotational force slowly decreases to a slightly negative value, and then the required knee rotational force slowly increases from a negative value to a positive value in the second half of the free leg period. Thus, the required knee rotational force in the running motion mode of the robot 1 increases in the stretching direction of the leg 3 during the supporting leg period, in particular. And, the required knee rotational force in the stretching direction during the supporting leg period generally increases as the desired knee flexing angle increases and decreases as the desired knee flexing angle decreases, and reaches a maximum (maximal) value almost at the same time when the desired knee flexing angle reaches the aforesaid supporting leg period maximum knee flexing angle θsupmax. Further, over the entire period in the running motion mode, the required knee rotational force takes a relatively small value in the flexing direction of the leg 3 or a value close to zero in a period during which the desired knee flexing angle is relatively small, e.g., a period during which the desired knee flexing angle is not more than θoff shown in FIG. 5(a).

The present embodiment considers the characteristics of the time-dependent changes of the desired knee rotational angle and the required knee rotational force described above in the running motion mode of the robot 1, and sets the kinetic characteristics of the piston 24 of the assist device 11 and the characteristics of the knee rotational assisting force of the spring means 21 as follows. In the assist device 11, when the leg 3 is bent (flexed) at the knee joint 8 from the state wherein the leg 3 has been stretched (wherein θ=0) as shown in FIG. 3(a), the piston 24 of the spring means 21 reaches the position of the upper ends of the grooves 28, as shown in FIG. 3(b), when the knee flexing angle θ increases to a predetermined value θoff that has been set beforehand (refer to FIG. 5(a)). In other words, the grooves 28 are formed such that, if the knee flexing angle θ is the predetermined value θoff or less, then the air chambers 25 and 26 are placed in the air-chambers-in-communication state. Hence, if the knee flexing angle θ is the predetermined value θoff or less, then the air-chambers-in-communication state is set, and the spring means 21 does not produce an elastic force, as described above, in the air-chambers-in-communication state. Accordingly, as shown in FIG. 4, if the knee flexing angle θ is the predetermined value θoff or less, then the knee rotational assisting force by the spring means 21 is zero.

And, if the knee flexing angle θ increases to exceed the predetermined value θoff (hereinafter referred to as the assisting force clearing knee flexing angle θoff), then the piston 24 moves to the upper side of the grooves 28, rendering the hermetically sealed air chamber state, as shown in FIG. 3(c). In this hermetically sealed air chamber state, as the knee flexing angle θ increases, the piston 24 moves upward in the cylinder 23, causing the gas in the upper air chamber 25 to be compressed, while causing the gas in the lower air chamber 26 to be expanded. A pressure difference between the gases imparts, to the piston 24, an elastic force in the direction for pushing the piston 24 downward. As such, the spring means elastically generates the assisting driving force by compression or expansion of the gas in the spring-gas-charged chamber as the piston slidably moves. In this case, although the elastic force itself increases as the knee flexing angle θ increases (the piston 24 moving upward), the link arm 32 of the motion transmitting means 22 swings, so that the knee rotational assisting force acting on the crus 5 about the supporting shaft 13 of the knee joint 8 increases in the stretching direction of the leg 3 as the knee flexing angle θ reaches a certain angle θa (>θoff), as shown in FIG. 4, and when the knee flexing angle θ exceeds the angle θa, the elastic force decreases in the stretching direction of the leg 3 as the knee flexing angle θ increases. In this case, θa is an angle that is slightly larger than the aforesaid supporting leg period maximum knee flexing angle θsupmax. In other words, the lengths of and the positional relationship between the piston rod 31 and the link arm 32 are set such that the knee rotational assisting force in response to a change in the knee flexing angle θ has a characteristic in which it bulges in the stretching direction of the leg 3 at the knee flexing angle θ exceeding θoff, and the knee rotational assisting force in the stretching direction takes a maximum value at an angle θa that is slightly larger than the supporting leg period maximum knee flexing angle θsupmax (hereinafter referred to as the assisting force maximum knee flexing angle θa). Supplementally, the assisting force maximum knee flexing angle θa corresponds to the second predetermined amount in the present invention, and the knee rotational assisting force at the assisting force maximum knee flexing angle θa corresponds to the assisting driving force predetermined value in the present invention.

Returning to the explanation of FIG. 1, the body 2 of the robot 1 has a control unit 40 for mainly controlling the operations of the joints 7, 8, and 9 of the legs 3, an accumulator unit 41 serving as a power source of the electric motors of the joints 7, 8, and 9, a posture sensor 42 for detecting postures of the body 2 (inclination angles relative to the vertical direction and rotational angles about an axis in the vertical direction), and a motor driver circuit 43 for controlling the energization of the electric motors. The posture sensor 42 is constructed mainly of a gyro sensor and an acceleration sensor. The accumulator unit 41 is constructed mainly of a battery (secondary cell) and a capacitor.

Figure 6:
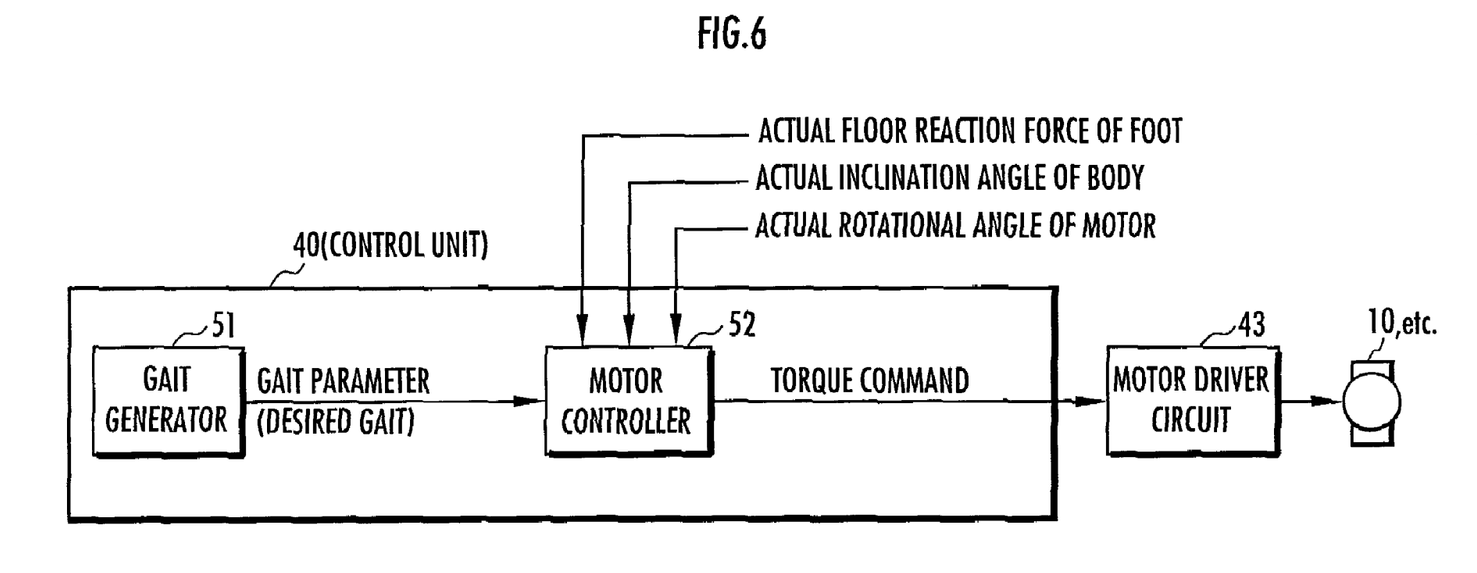
FIG. 6 is a block diagram showing a functional construction of a control unit provided in the robot shown in FIG. 1.

The control unit 40 is constructed of an electronic circuit that includes a microcomputer, etc., and equipped with a gait generator 51 and a motor controller 52 as its primary functional components, as shown in the block diagram of FIG. 6.

The gait generator 51 determines gait parameters (a pace, a gait cycle, a motion mode, etc.) that define a desired gait of the robot 1 on the basis of a command received from outside or teaching data (traveling plan data), which has been set beforehand, or the like for each step (each time a supporting leg is switched) when the robot 1 travels, and sequentially generates a desired gait (instantaneous desired gait) for each predetermined control cycle on the basis of the gait parameters. Here, the gait parameters determined by the gait generator 30 in the present embodiment are parameters that mainly define a desire gait for causing the robot 1 to perform a standard walking motion or a desired gait for causing the robot 1 to perform a running motion in a gait mode similar to a standard running gait mode of a human being. And, the desired gait is composed of, for example, the desired values of a position and a posture of the body 2 of the robot 1 (hereinafter referred to as the desired body position/posture), the desired values of a position and a posture of each foot 6 of the robot 1 (hereinafter referred to as the desired foot position/posture), the desired value of a resultant force (total floor reaction force) of floor reaction forces (translational forces and moments) acting on both feet 6 and 6 (hereinafter referred to as the desired total floor reaction force), and the desired position of a ZMP (Zero Moment Point) as the point of action of the total floor reaction force (hereinafter referred to as the desired ZMP). More specific contents of the components of a desired gait have been explained in detail by, for example, the present applicant in Japanese Unexamined Patent Application Publication No. H11-300660; therefore, the detailed explanation will be omitted herein. The contents of a desired gait are not necessarily limited to those disclosed in the aforesaid publication; basically, other contents may be adopted as long as a desired motion mode of the robot 1 can be expressed thereby.

The motor controller 52 sequentially controls the electric motors of the joints 7, 8 and 9, including the knee joint electric motor 10 (specifically, sequentially controls the rotational angles of the electric motors). The motor controller 52 sequentially generates torque commands that define torques to be generated in the electric motors (more specifically, the command values of currents supplied to the electric motors), as will be discussed later, on the basis of data on primarily a desired gait generated by the gait generator 51, an actual inclination angle of the body 2 detected by the posture sensor 42 (an actual inclination angle relative to the vertical direction), actual rotational angles of the joints 7, 8 and 9 of the leg 3 detected by using encoders, which are not shown, and an actual floor reaction force of each foot 6 detected by the six-axis force sensor 11. Then, the motor controller 52 outputs the generated torque commands to the motor driver circuit 43 to generate torques based on the torque commands at the electric motors through the intermediary of the motor driver circuit 43.

Figure 7:
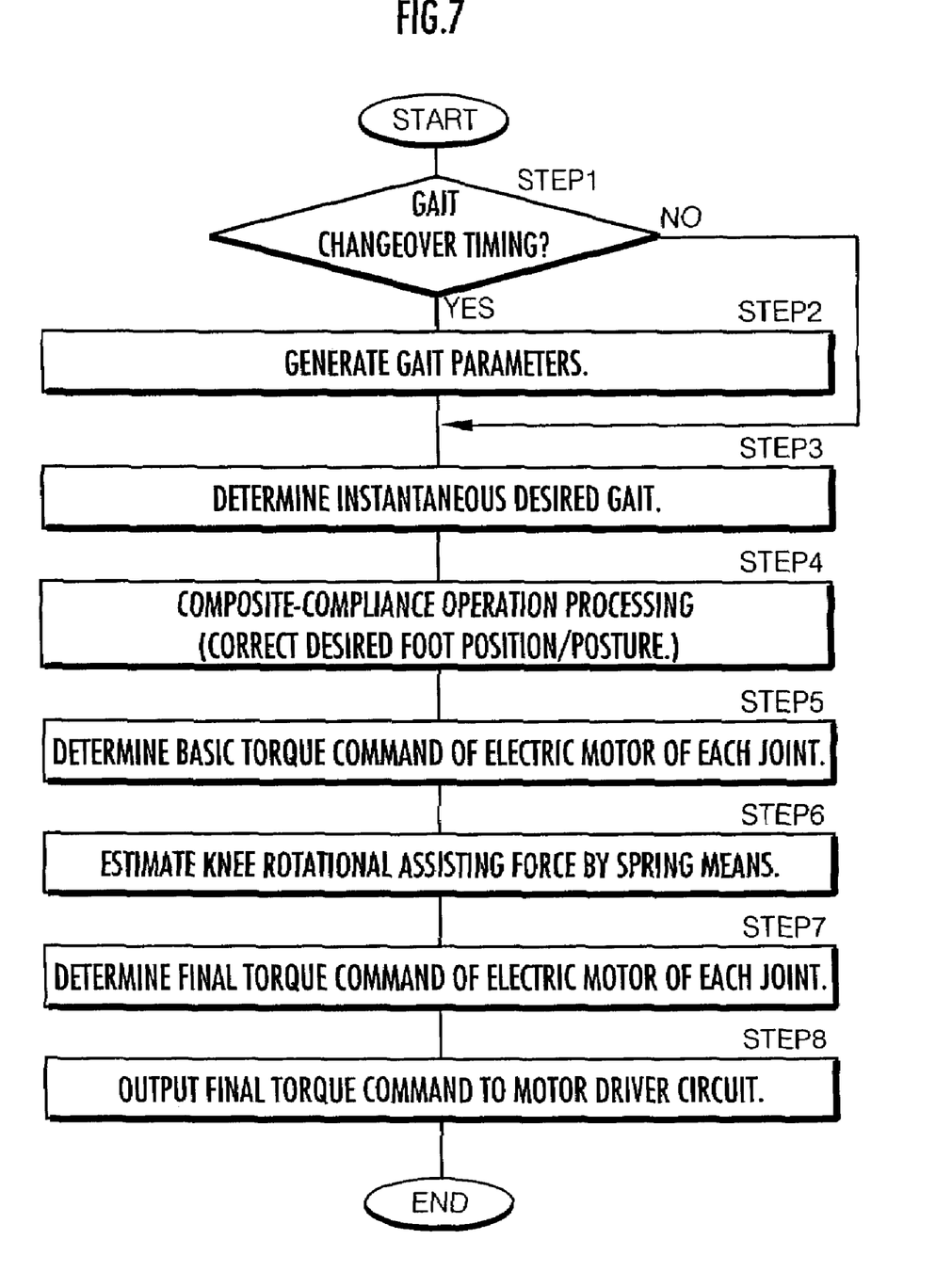
FIG. 7 is a flowchart showing the processing by the control unit shown in FIG. 6.

The operation of the system according to the present embodiment will now be explained with reference to the flowchart of FIG. 7. The control unit 40 carries out predetermined initialization processing, such as the initialization of a timer that clocks time, and then carries out the processing indicated by the flowchart of FIG. 7 for each predetermined control cycle (e.g., 50 ms) that has been set in advance. More specifically, the control unit 40 first determines whether the robot 1 is having a gait change-over timing (STEP1). Here, to be specific, the gait change-over timing is the timing at which the supporting leg when the robot 1 travels switches from one leg 3 to the other leg 3. And, if it is determined in STEP1 that it is not the gait change-over timing, then the processing by the control unit 40 proceeds to the processing in STEP3, which will be described later.

If the determination result in STEP1 indicates a gait change-over timing, then the control unit 40 generates (updates) gait parameters that define a desired gait of the robot 1 by the gait generator 51 on the basis of the operation command of the robot 1 given from an outer source or preset moving plan data (STEP2). Here, the desired gait defined by the gait parameters generated by the gait generator 51 is a desired gait up to, for example, the change-over timing of the next time gait or a timing that is slightly ahead thereof. In this case, if, for example, an operation command to the effect that the robot 1 is to perform a running motion is given from an outer source or if there is a situation wherein the robot 1 is to perform a running motion based on the moving plan data of the robot 1, then the desired gait defined by the gait parameters generated by the gait generator 51 is the desired gait for the running motion of the robot 1 (the desired gait for implementing the running motion of the robot 1 in the same mode as the aforesaid standard running gait mode). The desired knee flexing angle determined on the basis of the desired gait in this case is the one exhibiting the time-dependent change as shown in FIG. 5(*a*).

Subsequently, the control unit 40 carries out the processing of STEP3 through 5 by the motor controller 52. The processing of STEP3 through 5 is the processing for determining the torque commands (hereinafter referred to as the basic torque commands) of the electric motors of the joints 7, 8 and 9 that are necessary for the motions of the robot 1 to follow the desired gait if a knee rotational assisting force of the spring means 21 is not applied to the knee joint 8. Incidentally, the processing of STEP3 through 5 is explained in detail in Japanese Unexamined Patent Application Publication H11-300660 by the present applicant, so that the processing of STEP3 through 5 will be schematically explained below.

In STEP3, the control unit 40 determines an instantaneous desired gait on the basis of gait parameters currently being generated by the gait generator 51. This instantaneous desired gait is a desired gait for each control cycle of the processing by the control unit 40. As previously mentioned, to be more specific, the instantaneous desired gait is composed of desired body position/posture, desired foot position/posture, a desired total floor reaction force, and a desired ZMP in each control cycle. The processing in STEP3 further determines a desired floor reaction force of each leg 3 and the point of action of the desired floor reaction force for each control cycle on the basis of the desired foot position/posture, the desired total floor reaction force, the desired ZMP and the like.

In STEP4, the control unit 40 corrects the desired foot position/posture of the instantaneous desired gait by composite-compliance operation processing. More specifically, the composite-compliance operation processing determines a floor reaction force (moment) to be applied to the robot 1 in order to restore an actual inclination angle of the body 2 of the robot 1 (this being detected by the posture sensor 42) to a desired inclination angle determined by the desired body position/posture (to converge the difference between an actual inclination angle of the body 2 and a desired inclination angle to zero). Then, the resultant force of the determined floor reaction force (moment) and the desired total floor reaction force is defined as the desired value of the total floor reaction force to be actually applied to the robot 1. Further, the desired foot position/posture in each control cycle are corrected such that the resultant force of the actual floor reaction forces of the feet 6 detected by the six-axis force sensors 12 of the feet 6 follows the aforesaid desired value. The composite-compliance operation processing described above is for securing autonomous stability of a posture of the robot 1.

Then, in STEP5, the control unit 40 determines basic torque commands for the electric motors of the joints 7 to 9 of each leg 3 of the robot 1. To be more specific, this processing determines the desired rotational angles of the joints 7 to 9 of each leg 3 of the robot 1 by inverse kinematics arithmetic processing based on a model (rigid link model) of the robot 1 primarily from the desired body position/posture in an instantaneous desired gait and the desired foot position/posture corrected in STEP4 as described above. Then, the basic torque commands for the electric motors of the joints 7 to 9 are determined such that the actual rotational angles of the joints 7 to 9 (these being detected by encoders provided in the joints 7 to 9, the encoders being not shown) follow the desired rotational angles.

In this case, the basic torque command of the knee joint electric motor 10 (this corresponding to the aforesaid required knee rotational force) of each leg 3, for example, is determined according to Expression (1) given below from a difference $\Delta\theta$ between a desired knee flexing angle of the knee joint 8 and an actual knee flexing angle $\theta$ of the knee joint 8 (a detected value of the knee flexing angle $\theta$) and a torque Tff of the knee joint electric motor 10 (hereinafter referred to as the reference torque Tff) required to generate the desired floor reaction force relative to the leg 3.

$$\text{Basic torque command} = Kp \cdot \Delta\theta + Kv \cdot (d\Delta\theta/dt) + T\!f\!f \qquad (1)$$

The reference torque Tff used for the calculation of Expression (1) is determined by the inverse dynamics arithmetic processing based on a model of the robot 1 from desired body position/posture, desired foot position/posture, a desired floor reaction force relative to the leg 3, the desired rotational angular accelerations of the joints 7, 8 and 9, and the like. Kp and Kv in Expression (1) denote gain coefficients established beforehand, and $d\Delta\theta/dt$ denotes a time differential value of the difference $\Delta\theta$.

Here, the first term and the second term of the right side of Expression (1) are feedback control terms based on the aforesaid difference $\Delta\theta$, while the third term of the right side is a feed-forward control term for compensating for an influence of a floor reaction force acting on the leg 3. Further, the second term of the right side, in particular, is a term that has a buffering function (damping function) for promptly attenuating a vibration relative to a desired value of the knee flexing angle $\theta$.

For the electric motors of the joints 7 and 9 in addition to the knee joint 8, their basic torque commands are determined in the same manner as described above. As previously explained, the basic torque commands thus determined are the torque commands for the electric motors of the joints 7 to 9 that are necessary for motions of the robot 1 to follow the desired gaits in a state wherein the knee rotational assisting forces by the spring means 21 of the assist device 11 do not act on the knee joint 8.

The control unit 40 then estimates a knee rotational assisting force (specifically, a knee rotational assisting force for each control cycle) by the spring means 21 of the assist device 11 (STEP6). The estimated value of the knee rotational assisting force is used to determine a final torque command to the knee joint electric motor 10, and it is determined as shown below by, for example, the motor controller 52 in the present embodiment. More specifically, the data showing the characteristics of the spring means 21 shown in FIG. 4 relative to the knee flexing angle $\theta$ of a knee rotational assisting force is stored and retained in a memory, not shown, beforehand in the form of a data table or an approximate expression of the characteristics. Then, the motor controller 52 estimates the knee rotational assisting force according to the data table or the approximate expression mentioned above from a detected value (or a desired value) of the current knee flexing angle $\theta$. The knee rotational assisting force can be also directly detected by using a force sensor or the like.

Subsequently, the control unit 40 determines, by the motor controller 52, the final torque command as the definite torque command for each control cycle of the electric motors of the joints 7 to 9 of the leg 3 (STEP7). In this case, regarding the final torque commands to the knee joint electric motor 10, the final torque commands to the knee joint electric motor 10 are determined by subtracting the knee rotational assisting force determined in STEP6 mentioned above from the basic torque commands determined according to Expression (1) in STEP5 mentioned above (the command values of torques to be generated at the knee joint 8 on the basis of a desired gait on the assumption that the knee rotational assisting force is zero). More specifically, the final torque command to the knee joint electric motor 10 is generated such that the sum of the final torque command to the knee joint electric motor 10 (the command value of a torque to be actually generated in the knee joint electric motor 10) and the knee rotational assisting force equals the basic torque command. The final torque commands to the electric motors of the joints 7 and 9 other than the knee joint 8 use the basic torque commands as they are.

Subsequently, the control unit 40 outputs the final torque commands determined as described above to the motor driver circuit 43 (STEP8), thus terminating the processing for each control cycle. Based on the output final torque commands, the electric motors of the joints 7 to 9 are energized, and the rotational angles of the electric motors, namely, the rotational angles of the joints 7 to 9 are controlled to follow the predetermined rotational angles decided on the basis of the desired body position/posture and the desired foot position/posture described above (corrected by the aforesaid composite-compliance operation processing). Thus, the robot 1 travels according to the desired gait defined by the gait parameters.

In the system according to the present embodiment described above, in the supporting leg period of each leg 3 in the running motion mode of the robot 1, during the period in which the knee flexing angle $\theta$ increases, exceeding the assisting force clearing knee flexing angle $\theta$off (the period from time T1 to the time when the knee flexing angle $\theta$ reaches the supporting leg period maximum knee flexing angle $\theta$supmax in FIG. 5), the knee rotational assisting force of the spring means 21 increases in the stretching direction of the leg 3, as shown in FIG. 5(c). FIG. 5(c) is a graph showing a time-dependent change in the knee rotational assisting force applied to the knee joint 8 by the spring means 21 in response to a change in the knee flexing angle shown in FIG. 5(a). Then, in the following period during which the knee flexing angle $\theta$ decreases to the assisting force clearing knee flexing angle $\theta$off (the period from the time when the knee flexing angle $\theta$ reaches the supporting leg period maximum knee flexing angle $\theta$supmax to time T2 in FIG. 5), the knee rotational assisting force of the spring means 21 (the knee rotational assisting force in the stretching direction of the leg 3) decreases, as shown in FIG. 5(c). Hence, basically, in the period during which the required knee rotational force considerably increases in the stretching direction of the leg 3, the knee rotational assisting force of the spring means 21 increases accordingly, and in the following period during which the required knee rotational force in the stretching direction of the leg 3 decreases, the knee rotational assisting force of the spring means 21 decreases accordingly. In other words, in the period of the supporting leg period of each leg 3 during which the knee flexing angle $\theta$ exceeds the assisting force clearing knee flexing angle $\theta$off, the knee rotational assisting force of the spring means 21 increases or decreases according as the required knee rotational force in the stretching direction of the leg 3 increases or decreases. In this case, the knee rotational assisting force of the spring means 21 is maximized at the timing when the required knee rotational force in the stretching direction of the leg 3 substantially reaches its maximum. Further, in the period of the supporting leg period during which the knee flexing angle $\theta$ is the assisting force clearing knee flexing angle $\theta$off or less, the spring means 21 is placed in the aforesaid air-chambers-in-communication state, causing the knee rotational assisting force to be automatically set to zero. In this period, the required knee rotational assisting force takes a relatively small value in the flexing direction or a value close to zero.

Therefore, in the supporting leg period of each leg 3, the necessary driving force (torque) to be generated by the knee joint electric motor 10 is relatively small (the necessary torque being sufficiently smaller than the required knee rotational force), as shown in FIG. 5(d). FIG. 5(d) shows, by the solid line, the time-dependent change in the torque to be generated by the knee joint electric motor 10 in response to a change in the knee flexing angle shown in FIG. 5(a), and also shows the time-dependent change in the required knee rotational force (the same as the graph shown in FIG. 5(b)) by the dashed line.

Further, in the free leg period of each leg 3, during the period in which the knee flexing angle $\theta$ increases to the aforesaid free leg period maximum knee flexing angle $\theta$swgmax, exceeding the assisting force clearing knee flexing angle θoff, the knee rotational assisting force of the spring means 21 increases in the stretching direction of the leg 3 as the knee flexing angle θ increases, as shown in FIG. 5(c), until the knee flexing angle θ reaches the aforesaid assisting force maximum knee flexing angle θa (refer to FIG. 4). And, at the knee flexing angle θ that exceeds the assisting force maximum knee flexing angle θa, the magnitude (absolute value) of the knee rotational assisting force of the spring means 21 decreases from the knee rotational assisting force at the assisting force maximum knee flexing angle θa, as shown in FIG. 5(c), as the knee flexing angle θ increases to the free leg period maximum knee flexing angle θswgmax. Subsequently, during the period in which the knee flexing angle θ decreases from the free leg period maximum knee flexing angle θswgmax to the assisting force clearing knee flexing angle θoff, the magnitude (absolute value) of the knee rotational assisting force of the spring means 21 increases as the knee flexing angle θ decreases, as shown in FIG. 5(c), until the knee flexing angle θ reaches the assisting force maximum knee flexing angle θa. And, at the knee flexing angle θ of the assisting force maximum knee flexing angle θa or less, the magnitude (absolute value) of the knee rotational assisting force of the spring means 21 decreases from the knee rotational assisting force at the assisting force maximum knee flexing angle θa, as shown in FIG. 5(c), as the knee flexing angle θ decreases to the assisting force clearing knee flexing angle θoff. Hence, in the free leg period of each leg 3, the magnitude (absolute value) of the knee rotational assisting force of the spring means 21 will not exceed the knee rotational assisting force at the assisting force maximum knee flexing angle θa. This means that a maximum knee rotational assisting force in the free leg period will stay to be approximately equal to a knee rotational assisting force in the supporting leg period. In the period in which the knee flexing angle θ becomes the assisting force clearing knee flexing angle θoff or less immediately before the end of the free leg period, the knee rotational assisting force of the spring means 21 will automatically become approximately zero. In this period, the required knee rotational assisting force takes a value that is relatively small in the flexing direction.

Thus, also in the free leg period, the driving force (torque) generated in the knee joint electric motor 10 does not become excessively large, a relatively small driving force being required.

Hence, a relatively small the driving force is required to be generated in the knee joint electric motor 10 throughout the entire period, including the supporting leg period and the free leg period, of each leg 3 when the robot 1 is in the running motion mode. This eliminates the possibility of a situation wherein a large current must be supplied to the knee joint electric motor 10, leading to minimized energy loss attributable to Joule heat or the like. Moreover, the maximum value of the driving force to be generated in the knee joint electric motor 10 remains relatively small, so that the electric motor 10 can be made smaller.

Further, in the present embodiment, the assisting force maximum knee flexing angle θa is set to be slightly larger than the supporting leg period maximum knee flexing angle θsupmax. Hence, the knee rotational assisting force of the spring means 21 monotonously (linearly) increases or decreases in response to an increase or decrease in the knee flexing angle θ in the supporting leg period of the leg 3, making it possible to smoothly secure the stability of the robot 1 by the composite-compliance operation processing described above.

Further, especially in a situation wherein the knee flexing angle θ is the assisting force clearing knee flexing angle θoff or less and the required knee rotational assisting force is close to zero (e.g., in the period of time T2 to T3 shown in FIG. 5), the knee rotational assisting force of the spring means 21 will automatically become zero. This arrangement obviates the need for generating, in the knee joint electric motor 10, a driving force for canceling the knee rotational assisting force, thus permitting extra power consumption of the knee joint electric motor 10 to be restrained.

Further, in addition to the case of the running motion mode of the robot 1, when maintaining the robot 1 in an upright posture state, the knee flexing angle θ will not increase much (the θ being generally maintained to be θoff or less), and in a gait (motion mode) of the robot 1 wherein the required knee rotational force does not increase much, no special control of the spring means 21 that would involve power consumption is necessary. Moreover, since the knee rotational assisting force of the spring means 21 can be automatically brought to substantially zero, the power consumption of the robot 1 can be restrained.

Further, in the running motion mode of the robot 1, each time the knee flexing angle θ reduces to the assisting force clearing knee flexing angle θoff or less, the air chambers 25 and 26 are mechanically brought into communication through the grooves 28, causing them to have substantially mutually equal pressures. With this arrangement, even if a gas leaks between the two air chambers 25 and 26 through a gap or the like between the piston 24 and the cylinder 23 in the condition wherein the air chambers are airtight, it is possible to restrain changes in the characteristics of the knee rotational assisting force of the spring means 21 relative to the knee flexing angle θ (e.g., a change whereby the value of the knee flexing angle θ at which the knee rotational assisting force takes a certain value gradually shifts as time elapses).

In the embodiment explained above, the air chambers 25 and 26 of the spring means 21 have been brought into communication through the grooves 28 when the knee flexing angle θ is small (when θ≦θoff); alternatively, however, they may be brought into communication through, for example, a communication tube provided outside the cylinder 23. However, forming the grooves 28, as in the present embodiment, is advantageous in reducing the size of the spring means 21.

Further, in the aforesaid embodiment, both air chambers 25 and 26 have been spring-gas-charged chambers; alternatively, however, only one of the air chambers 25 and 26 may be a spring-gas-charged chamber and the other air chamber may be always opened to the atmosphere side. For instance, only the upper air chamber 25 may be the spring-gas-charged chamber and the lower air chamber 26 may be always opened to the atmosphere side. In this case, when the knee flexing angle θ exceeds the assisting force clearing knee flexing angle θoff, the spring means 21 produces an elastic force only by a gas in the air chamber 25. In this case, instead of forming the grooves 28 in the inner peripheral surface of the cylinder 23, only a hole for communication with the atmosphere side may be formed in the cylinder 23 at the location corresponding to the upper ends of the grooves 28. However, both air chambers 25 and 26 are preferably used as the spring-gas-charged chambers, as in the present embodiment, in reducing the size of the construction of the spring means 21 and maximizing the knee rotational assisting force that can be generated by the spring means 21.

Further, in the aforesaid embodiment, the spring means 21 has been mounted on the thigh 4; alternatively, however, it may be mounted on the crus 5.

Further, in the aforesaid embodiment, the motion transmitting means 22 has been constructed using the link arm 32; alternatively, however, knee flexing/stretching motions may be transmitted to the piston 24 of the spring means 21 by using a cam provided such that the cam rotates about the supporting shaft of the knee joint together with the crus, as shown in, for example, FIG. 10 of the aforesaid Japanese Unexamined Patent Application Publication No. 2003-145477.

Further, in the aforesaid embodiment, the present invention has been explained by taking the case where the present invention has been applied to the bipedal mobile robot; however, the present invention can be also applied to a robot equipped with two or more legs.

Further, in the aforesaid embodiment, the spring means 21 has been provided with the characteristics such that the knee rotational assisting force takes a maximal value at the assisting force maximum knee flexing angle θa within the range in which the knee flexing angle θ exceeds θoff. Alternatively, however, the knee rotational assisting force may be maintained to be substantially the same value as a value at θa even if the knee flexing angle θ further increases after the knee flexing angle θ increases to θa. The characteristics of the knee rotational assisting force relative to the knee flexing angle can be easily implemented by, for example, using a cam, as described above, as the means for transmitting the knee flexing/stretching motions to the piston 24 of the spring means 21.

INDUSTRIAL APPLICABILITY

As described above, the leg joint assist device of a legged mobile robot in accordance with the present invention is useful as the one that allows an assisting driving force to be properly applied to a joint of a leg of a legged mobile robot, such as a bipedal mobile robot, while reducing energy consumption of the robot by using a small and simple construction.

The invention claimed is:

1. A leg joint assist device of a legged mobile robot, wherein the legged mobile robot is equipped with a plurality of legs constructed by consecutively installing a plurality of link members from its body through the intermediary of a plurality of joints, the leg joint assist device comprising:

a spring means attached to at least one of the link members, for generating an assisting driving force to be imparted to a specific joint, together with a driving force of a joint actuator attached to the legged mobile robot for driving the specific joint, by the elastic energy accumulated in response to a relative displacement motion of a pair of link members connected by the specific joint, at least one joint of the plurality of joints of each leg being defined as the specific joint, wherein the spring means comprises a cylinder, a piston provided such that the piston slidably moves in the cylinder in response to a relative displacement motion of the pair of link members, a pair of air chambers that are formed on both sides of the piston in the cylinder and whose volumes change in response to a sliding movement of the piston, at least one air chamber of the pair of air chambers being a spring-gas-charged chamber, and a gas charged in the spring-gas-charged chamber, the spring means elastically generating the assisting driving force by compression or expansion of the gas in the spring-gas-charged chamber as the piston slidably moves; and a gas passage provided in the spring means such that the gas passage brings the spring-gas-charged chamber into communication with outside if a relative displacement amount of the pair of link members falls within a predetermined range set beforehand, while the gas passage shuts off the spring-gas-charged chamber from outside by the piston if the relative displacement amount deviates from the predetermined range, wherein if a relative displacement amount of the pair of link members falls within the predetermined range, then the gas is circulated between the spring-gas-charged chamber and outside through the gas passage in response to a sliding movement of the piston according to a relative displacement motion of the pair of link members, thereby preventing compression or expansion of the gas in the spring-gas-charged chamber.

2. The leg joint assist device of a legged mobile robot according to claim 1, wherein the spring-gas-charged chamber comprises both of the paired air chambers and the gas passage is a gas passage that provides mutual communication between the paired air chambers if a relative displacement amount of the pair of link members lies within the predetermined range, one air chamber of the paired air chambers serving as the outside relative to the other air chamber.

3. The leg joint assist device of a legged mobile robot according to claim 1, wherein the gas passage is composed of one or more grooves formed in the inner peripheral surface of the cylinder, and if a relative displacement amount of the pair of link members lies within the predetermined range, then one end of each groove is brought into communication with one of the pair of air chambers and the other end of the groove is brought into communication with the other of the pair of air chambers, or if a relative displacement amount of the pair of link members deviates from the predetermined range, then both ends of each groove are shut off by the piston from at least either one air chamber of the pair of air chambers.

4. The leg joint assist device of a legged mobile robot according to claim 1, wherein the legged mobile robot is a bipedal mobile robot comprising two legs, each leg being formed by consecutively installing a thigh, a crus, and a foot in order, as the link members, through the intermediary of a hip joint, a knee joint, and an ankle joint from the body side, the specific joint is a knee joint that flexibly connects the thigh and the crus serving as the pair of link members, and the predetermined range of relative displacement amount of the pair of link members is a range in which a flexing degree as the relative displacement amount of the thigh and the crus at the knee joint becomes a predetermined amount or less.

5. The leg joint assist device of a legged mobile robot according to claim 4, wherein the spring means is constructed such that, if the flexing degree lies in a range between the aforesaid predetermined amount and a second predetermined amount, which is higher than the predetermined amount, then the assisting driving force increases in the leg stretching direction as the flexing degree increases and if the flexing degree is a flexing degree that exceeds the second predetermined amount, then the assisting driving force is smaller than an assisting driving force predetermined value, which is the value of the assisting driving force obtained when the flexing degree is set to agree with the second predetermined amount, or the assisting driving force is approximately equal to the assisting driving force predetermined value.

6. The leg joint assist device of a legged mobile robot according to claim 5, wherein the second predetermined amount is a flexing degree equal to a maximum flexing degree in a state in which each leg is in contact with a floor when the bipedal mobile robot travels on a floor.

7. The leg join assist device of a legged mobile robot according to claim 5, wherein the spring means is attached to the crus by a link arm, wherein said link arm is adapted to translate the assisting driving force to the crus such that the assisting driving force increases in the leg stretching direction as the flexing degree increases to the first predetermined amount the assisting driving force decreases from the assisting driving force predetermined value as the flexing degree increases from the first predetermined amount to the second predetermined amount.

8. The leg joint assist device of a legged mobile robot according to claim 7, wherein the second predetermined amount is a flexing degree equal to a maximum flexing degree in a state in which each leg is in contact with a floor when the bipedal mobile robot travels on a floor.

\* \* \* \* \*

UNITED STATES PATENT AND TRADEMARK OFFICE
CERTIFICATE OF CORRECTION

| | |
|---|---|
| PATENT NO. | : 7,658,246 B2 |
| APPLICATION NO. | : 11/575545 |
| DATED | : February 9, 2010 |
| INVENTOR(S) | : Takenaka et al. |

It is certified that error appears in the above-identified patent and that said Letters Patent is hereby corrected as shown below:

In Column 22, Line 6, in Claim 7, delete "join" and insert -- joint --

Signed and Sealed this

Twenty-seventh Day of April, 2010

David J. Kappos
*Director of the United States Patent and Trademark Office*